United States Patent Office 3,317,385
Patented May 2, 1967

3,317,385
METHOD OF TREATMENT OF DEPRESSION IN MAMMALS
Daniel A. Prins, Oberwil, Basel-Land, Switzerland, assignor to Geigy Chemical Corporation, Ardsley, N.Y., a corporation of Delaware
No Drawing. Filed Jan. 21, 1963, Ser. No. 252,592
Claims priority, application Switzerland, July 24, 1961, 8,704/61; June 21, 1962, 7,504/62
5 Claims. (Cl. 167—65)

This application is a continuation-in-part of my copending application Ser. No. 211,890, filed July 23, 1962 (now abandoned).

The present invention concerns the use of novel compositions containing as essential ingredients a phenothiazine derivative, for the treatment of depression in mammals.

It has surprisingly been found that compositions containing the phenothiazine compound of the formula

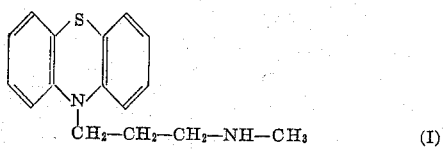

or

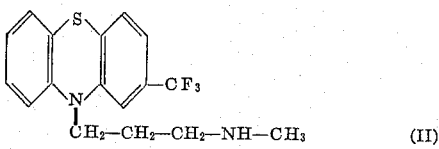

or a non-toxic, i.e. pharmacologically acceptable acid addition salt thereof as active ingredients and at least one pharmaceutically acceptable carrier, have reserpine-antagonistic and serotonin-antagonistic properties and are valuable agents for the treatment of depressions.

This is particularly unexpected because a structurally closely related compound, namely the well-known 10-(3-dimethylamino-propyl)-phenothiazine (cf. U.S. Patent 2,519,886) is a neuroleptic agent, and not an antidepressive. Thus, it fails to stimulate normal mammals, such as e.g. normal test animals, and, furthermore, it fails to counteract model depressions in such test animals. Such model depressions in test animals are created by medication with e.g. reserpine and certain benzoquinolizine compounds, as described, for instance, by Domenjoz and Theobald in Arch. Int. Pharmacodyn. et Thérap., 120, 450 (1959) and Brodie et al. in Psychopharmacologia, 2, 476 (1961). As a neuroleptic, the known 10-(3-dimethylaminopropyl)-phenothiazine strongly potentiates the action of anaesthetics and hypnotics, reduces motor activity and fighting instinct in normal animals, possesses anti-emetic activity and is also adrenolytic.

In contrast thereto, the new compositions containing the compound of Formula I show an unexpected pharmacologically very interesting combination of properties in that, apart from its properties of potentiating anaesthetics, reducing fighting instinct and reducing emesis, it is additionally and unexepectedly endowed with pronounced anti-depressive properties, as measured by art recognized test procedures in which 10-(3-dimethylamino-propyl)-phenothiazine is essentially inactive. The compound of Formula I not only antagonizes the effect of reserpine and also shows a strong reduction of the antihistaminic and adrenolytic properties and preservation of the antiserotonine activity of the known tertiary amine, it even reverses, in test animals, and in a safe range of dosage well below lethal dose, the effect of 2-hydroxy-2-ethyl-3-isobutyl-9,10-dimethoxy-1,2,3,4,6,7-hexahydro-11b (H)-benz[a]quinolizine in that it brings about a state of hyperactivity.

Thus, by virtue of their dual properties, the compositions containing the compound of Formula I and their pharmaceutically acceptable acid-addition salts can be used specifically as anti-depressives, in particular for the treatment of agitated depressions.

Furthermore, compositions with compound II have a stimulating action in psychomotorically diminished psychoses. They are particularly suitable for the treatment of psychomotorically diminished depressions as well as of catatonic and stuporous states. This is also particularly surprising as, in contrast thereto, preparations containing 10-(γ-dimethylamino-propyl)-2-trifluoromethyl-phenothiazine as active substance have a tranquillising anti-excitatory activity and are particularly valuable for the treatment of the psychomotor agitation associated with various acute and chronic psychoses such as, e.g. schizophrenia, mania and agitated depressions.

Because of their reserpin-antagonistic activity, another indication for the preparations according to the invention is the treatment of states of retarded or diminished psychomotor activity caused by reserpin and of depressions.

The quick onset of action on administration of the preparations according to the invention is also to be noted.

The compound mentioned above is produced, for example, by reaction of 10-(γ-chloropropyl)-phenothiazine with methylamino, or by reaction of 5-(γ-dimethylaminopropyl)-phenothiazine with a low chloroformic acid alkyl ester and hydrolysis of the 10-[γ-(N-carbalkoxy-methylamino)-propyl]-phenothiazine obtained. Details regarding a suitable method of performing the latter production process are given in Example 1.

By non-toxic salts of the base usable according to the invention are meant salts with those acids, the acid component of which is pharmacologically acceptable in the intended dosages, i.e. they have no toxic effects. In addition, it is sometimes of advantage if the salts to be used crystallize well, and are not, or are only slightly, hygroscopic.

In addition to the hydrochloride mentioned above, for example, the salts with hydrobromic acid, sulfuric acid, nitric acid, phosphoric acid, methane sulfonic acid, ethane sulfonic acid, β-hydroxy-ethane sulfonic acid, camphor sulfonic acid, ethane disulfonic acid, formic acid, acetic acid, propionic acid, butyric acid, valeric acid, glycolic acid, lactic acid, gluconic acid, succinic acid, benzoic acid, salicylic acid, gentisic acid, mandelic acid, or the salts with other substances having an acid reaction such as, e.g., 8-chlorotheophyllin, can be employed as non-toxic salts of the compound of Formula I. Such salts are useful as components of the preparations according to the invention.

The daily dosages vary between about 20 and about 300, and preferably 50 to 200, mg. for adult individuals. Suitable dosage units such as dragées (sugar coated tablets), tablets, capsules, suppositories or ampoules preferably contain from about 10 to about 200, and preferably 10 to 50, mg. of the active substance of Formula I or of its non-toxic salts.

To produce dosage units for peroral application, the said active substance of general Formula I or a non-toxic salt thereof is combined, e.g., with solid pharmaceutically acceptable pulverulent carriers such as lactose, saccharose, sorbitol, mannitol; starches such as potato starch, corn starch or amylopectin, also laminaria powder or citrus pulp powder; cellulose derivatives or gelatin, also lubricants such as magnesium or calcium stearate or polyethylene glycols (Carbowaxes) of suitable molecular weights may be added, to form tablets or dragée cores. The latter are coated for example, with concentrated sugar solutions which can contain, e.g., gum arabic, talcum and/or titanium dioxide, or they are coated with a lacquer dissolved in easily volatile organic solvents or a mixture of organic solvents. Dyestuffs can be added to these coatings, for example, to distinguish between different contents of active substance. Soft gelatin capsules (pearl-shaped closed capsules) and other closed capsules consist for example of a mixture of gelatin and glycerine and contain, e.g., mixtures of the active substance or a suitable salt thereof with Carbowax, and hard gelatin capsules contain, for example, granules of the active substance or a suitable salt thereof with solid, pulverulent carriers such as, e.g., lactose, saccharose, sorbitol, mannitol, and further starches such as potato starch, corn starch or amylopectin, cellulose derivatives or gelatin, as well as magnesium stearate or stearic acid. Suppositories are employed in dosage units for rectal application, which consist of a combination of the active substance or a suitable salt thereof with a neutral fatty basis; gelatin rectal capsules can also be employed which consist of a combination of the active substance or a suitable salt thereof with polyethylene oxides (Carbowaxes) of a suitable molecular weight.

Such tablets, dragées and capsules contain preferably between about 10 and about 50 mg. of the compound of Formula I or a suitable salt thereof, said amounts constituting 1 to 90 and preferably about 15 to about 60% of the total weight of the tablets, dragées and capsules respectively.

The following non-limiting examples merely illustrate the production of the active compound of Formula I as well as the preparation of the compositions according to the invention.

EXAMPLE 1

26 g. of 10-(γ-dimethylamino-propyl)-phenothiazine are dissolved in 100 ml. of anhydrous benzene and the solution is slowly added dropwise at 40° C. to a stirred solution of 9.6 ml. of ethyl chloroformate in 50 ml. of anhydrous benzene. Methyl chloride is developed. The reaction solution is then refluxed for 4 hours and afterwards filtered. The filtrate is washed with 2 N hydrochloric acid, dried and concentrated. The crude 10-[γ-(N-methyl-N-carbethoxyamino) - propyl]-phenothiazine which remains, in a mixture of 100 ml. of diethylene glycol monoethyl ether and 25 g. of potassium hydroxide, is kept at gentle reflux for 6 hours. 500 ml. of water are then added to the reaction mixture, which is then twice thoroughly extracted with ether. After concentrating the dried ether solutions, an almost colourless oil is obtained. 2 N hydrochloric acid is added thereto, whereupon 10-(γ-methylamino-propyl)-phenothiazine hydrochloride crystallizes. It is purified by recrystallization from methanol/ether. M.P. 159–160°.

EXAMPLE 2

250 g. 10-(γ-methylamino-propyl)-phenothiazine hydrochloride are mixed with 175.80 g. of lactose and 169.70 grams of potato starch, the mixture is moistened with an alcoholic solution of 10 g. of stearic acid and tato starch, 200 g. of talcum, 2.50 g. of magnesium stearate and 32 g. of colloidal silicium dioxide are mixed in and the mixture is pressed into 10,000 tablets each weighing 100 mg. and containing 25 mg. of active substance (hydrochloride). The tablets can be marked with break lines if desired to enable a closer adaption of the dosage to be made.

EXAMPLE 3

A granulate is prepared from 250 g. of 10-(γ-methylamino-propyl)-phenothiazine hydrochloride, 175.90 g. of lactose and the alcoholic solution of 10 g. of stearic acid. After drying, the granulate is mixed with 56.60 g. of colloidal silicium dioxide, 165 g. of talcum, 20 g. of potato starch and 2.50 g. of magnesium stearate and pressed into 10,000 dragée centers. These are first coated with 6 g. of shellack, then with a concentrated syrup of 502.28 g. of crystallized saccharose, 10 g. of gum arabic, 0.22 g. of dyestuff of 1.5 g. of titanium dioxide and dried. The dragées obtained each weigh 120 mg. and contain 25 mg. of active substance.

EXAMPLE 4

250 g. of 10-(γ-methylamino-propyl)-phenothiazine hydrochloride are mixed with 442.8 g. of potato starch and 295.2 g. of lactose, the mixture is moistened with an alcoholic solution of 30.0 g. of stearic acid and granulated through a sieve. After drying, this granulate is mixed with 96.0 g. of talcum, 80.0 g. of potato starch and 6.0 g. of magnesium stearate, and the mixture so obtained is again granulated through a sieve. This granulate serves for the preparation of 10,000 hard gelatin capsules, each containing 120 mg. of the granulate including 25 mg. of the active substance.

EXAMPLE 5

1.25 g. of 10-(γ-methylamino-propyl)-phenothiazine hydrochloride, 0.10 g. of ascorbic acid, 0.05 g. of sodium bisulfite and 0.10 g. of sodium sulfate are dissolved in distilled water until the volume is 100 ml. This solution is used to fill ampoules, each of preferably 2 ml. and containing 25 mg. of active substance. The ampoules are sterilised hot in the usual way.

The hydrochloride used in the above examples can be replaced, e.g. by the same amounts of a salt of another of the acids mentioned above.

EXAMPLE 6

*Preparation of 10-(γ-methylamino-propyl)-2-trifluoromethyl-phenothiazine*

17.6 parts of 10-(γ-dimethylamino-propyl)-2-trifluoromethyl-phenothiazine are dissolved in 150 parts by volume of abs. benzene and the solution is added dropwise while stirring at 40–50° to 9.2 parts by volume of chloroformic acid ethyl ester in 50 parts by volume of abs. benzene whereupon methyl chloride is given off. The reaction solution is then refluxed for 6 hours, after which it is filtered, washed with 2 N hydrochloric acid, dried and concentrated. The crude 10 - [γ - (N-methyl-N-carboethoxy-amino) - propyl]-2-trifluoromethyl-phenothiazine which remains is heated for 6 hours at 180° in a mixture of 75 parts by volume of diethylene glycol monoethyl ether and 7.5 parts of potassium hydroxide. After cooling, 600 parts by volume of water are added to the reaction mixture which is then thoroughly extracted with ether. After concentrating the dried ether solutions, an almost colourless oil is obtained. This is treated with ethereal oxalic acid solution whereup 10-(γ-methylamino-propyl)-2-trifluoromethyl-phenothiazine oxalate precipitates. It is purified by rercystallisation from methanol; M.P. 211–213°. The fumarate melts at 157–158°.

EXAMPLE 7

250 g. of 10-(γ-methylamino-propyl)-2-trifluoromethyl-phenothiazine fumarate are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 250 g. of magnesium stearate and 32 g. of colloidal silicium dioxide are mixed in and the mixture is pressed into 10,000 tablets each weighing 100 mg. and containing 25 mg. of active substance (fumarate). If desired the tablets can be marked with break lines to enable a closer adaptation of the dosage to be made.

EXAMPLE 8

A granulate is produced from 250 g. of -10-(γ-methylamino-propyl)-2-trifluoromethyl-phenothiazine fumarate, 175.90 g. of lactose and the alcoholic solution of 10 g. of stearic acid. After drying, the graulate is mixed with 56.60 g. of colloidal silicium dioxide, 165 g. of talcum, 20 g. of potato starch and 2.50 g. of magnesium stearate and the mixture is pressed into 10,000 centres for sugar coated tablets (dragées). These are then coated with a concentrated syrup consisting of 502.28 g. of crystallised saccharose, 6 g. of shellack, 10 g. of gum arabic, 0.22 g. of dyestuff and 1.5 g. of titanium dioxide and dried. Each of the dragrées obtained weighs 120 mg. and contains 25 mg. of active substance.

EXAMPLE 9

250 g. of 10-(γ-methylamino-propyl)-2-trifluoromethyl-phenothiazine fumarate are mixed with 442.8 g. of potato starch and 295 g. of lactose, the mixture is moistened with an alcoholic solution of 30.0 g. of stearic acid and granulated through a sieve. After drying, this granulate is mixed with 96.0 g. of talcum, 80.0 g. of potato starch and 6.0 g. of magnesium stearate and the mixture is again granulated through a sieve. This granulate is used to fill 10,000 hard gelatine capsules each weighing 120 mg. Each of the capsules obtained in this way contains 25 mg. of active substance.

EXAMPLE 10

0.50 g. of 10-(γ-methylamino-propyl)-2-trifluoromethyl-phenothiazine fumarate, 0.10 g. of ascorbic acid, 0.05 g. of sodium bisulphite and 0.10 g. of sodium sulphite are dissolved in distilled water up to 100 ml. The solution is used to fill ampoules, each preferably of 2 ml. which corresponds to a content of 10 mg. active substance, which are sterilised hot in the usual way.

The fumarate used in the above examples can be replaced, for example, by the same amounts of a salt of one of the other acids mentioned above.

What is claimed is:
1. A method for treating depression in mammals by eliciting an antidepressive effect without tranquilization which comprises administering to said mammals an antidepressively effective amount of a member selected from the group consisting of the compounds of the formula:

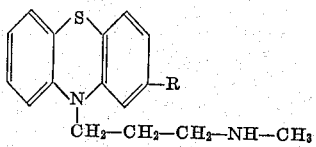

and the pharmaceutically acceptable non-toxic salts thereof wherein R is a member selected from the group consisting of H and $CF_3$.
2. The method of claim 1 wherein R is H.
3. The method of claim 1 where in R is $CF_3$.
4. The method of claim 2 wherein the amount administered is from about 20 to about 200 mg. daily for an adult mammal.
5. The method of claim 3 wherein the amount administered is from about 20 to about 200 mg. daily for an adult mammal.

References Cited by the Examiner

UNITED STATES PATENTS

| | | | |
|---|---|---|---|
| 2,534,237 | 12/1950 | Cusic | 260—243 |
| 2,687,414 | 8/1954 | Cusic | 260—243 |
| 2,830,987 | 4/1958 | Gailliot | 167—65 |
| 2,921,069 | 1/1960 | Ullyot | 260—243 |
| 2,997,468 | 8/1961 | Schwartz | 260—243 |
| 3,004,028 | 10/1961 | Dolliver | 167—65 |
| 3,023,146 | 2/1962 | Tislow | 167—65 |
| 3,057,861 | 10/1962 | Florey | 260—243 |

OTHER REFERENCES

Brodie: Psychopharmacologia, vol. 2, pp. 467–474, 1961.
Chem. Abst., vol. 51, pp. 424–425, 1957.
Hermann: Arch. Int. Pharmacodyn., vol. CXXVI, No. 3–4, pp. 454–455 (1960).
Hollister: Annals of Int. Med., vol. 51, No. 5, pp. 1041, November 1959.
Kuhn: Schweizerische Medizinische Wichenschrift, vol. 87, pp. 1135–1140, 1957.
Lehmann: Canadian Psychiatric Assoc. J., vol. 3, No. 4, pp. 155–164, October 1958.
Meduna: J. of Neuropsychiatry, vol. 2, No. 5, pp. 232–237.
Sandoz: Bibliographia, Tabulae, E., No. 2 December 1962, 4 pages.

SAM ROSEN, *Primary Examiner.*

FRANK CACCIAPAGLIA, JULIAN S. LEVITT, *Examiners.*

P. L. SABATINE, *Assistant Examiner.*

UNITED STATES PATENT OFFICE
CERTIFICATE OF CORRECTION

Patent No. 3,317,385                           May 2, 1967

Daniel A. Prins

It is hereby certified that error appears in the above numbered patent requiring correction and that the said Letters Patent should read as corrected below.

Column 3, line 59, after "acid and " insert -- granulated through a sieve. After drying, 160 g. of po- --.

Signed and sealed this 28th day of November 1967.

(SEAL)
Attest:

Edward M. Fletcher, Jr.                      EDWARD J. BRENNER
Attesting Officer                             Commissioner of Patents